(12) United States Patent
Wei et al.

(10) Patent No.: US 12,520,038 B1
(45) Date of Patent: Jan. 6, 2026

(54) SMART GLASSES DEVICE AND RESPONSE INSTRUCTION GENERATING METHOD

(71) Applicant: HTC Corporation, Taoyuan (TW)

(72) Inventors: Chang Hua Wei, Taoyuan (TW); Sheng-Cherng Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/979,652

(22) Filed: Dec. 13, 2024

(51) Int. Cl.
*H04N 23/60* (2023.01)
*G06F 3/01* (2006.01)
*G06F 3/0346* (2013.01)
*G10L 15/22* (2006.01)
*H04N 23/667* (2023.01)
*H04N 23/698* (2023.01)

(52) U.S. Cl.
CPC ............. *H04N 23/64* (2023.01); *G06F 3/013* (2013.01); *G06F 3/0346* (2013.01); *G10L 15/22* (2013.01); *H04N 23/667* (2023.01); *H04N 23/698* (2023.01)

(58) Field of Classification Search
CPC .................................................. H04N 23/64
See application file for complete search history.

(56) References Cited

U.S. PATENT DOCUMENTS 8,775,128 B2 * 7/2014 Meduna .................. G06F 17/00
702/182

\* cited by examiner

*Primary Examiner* — Y Lee
(74) *Attorney, Agent, or Firm* — CKC & Partners Co., LLC

(57) ABSTRACT

A smart glasses device and a response instruction generating method are provided. In response to receiving a startup instruction, the device activates an image capturing device to capture at least one real-time image in a first time interval. The device determines a target image set from the at least one real-time image based on an amplitude change of a plurality of inertial sensing data corresponding to a second time interval. The device generates a response instruction based on an analysis result corresponding to the target image set, and the analysis result is generated based on a voice prompt corresponding to a user.

20 Claims, 7 Drawing Sheets

SMART GLASSES DEVICE AND RESPONSE INSTRUCTION GENERATING METHOD

BACKGROUND

Field of Invention

The present invention relates to a smart glasses device and a response instruction generating method. More particularly, the present invention relates to a smart glasses device and a response instruction generating method that can reduce the computational burden of generating a response instruction.

Description of Related Art

In recent years, various technologies and applications that combine devices and image analysis models (e.g., artificial intelligence analysis models) have been proposed one after another. The user can perform many image analyses and auxiliary operations with the devices.

In ordinary life situations, the user can perform image analyses and auxiliary operations through a smart glasses device. However, since the smart glasses device is worn for a long time and the smart glasses device needs to capture a large number of real-time images for a long time, a large amount of power resources and computing resources of the smart glasses device are consumed.

In addition, in the existing technology, analyzing a large number of real-time images through the image analysis model will consume a lot of computing resources. Therefore, if a large number of real-time images are input into the image analysis model for each analysis, the computing resources and efficiency of the device will be reduced.

Accordingly, there is an urgent need for a response instruction generating technology that can reduce the computational burden of generating a response instruction.

SUMMARY

An objective of the present disclosure is to provide a smart glasses device. The smart glasses device comprises an image capturing device, an inertial measurement unit, and a processor. The processor is electrically connected to the image capturing device and the inertial measurement unit. The inertial measurement unit is configured to generate a plurality of inertial sensing data. In response to receiving a startup instruction, the processor activates the image capturing device to capture at least one real-time image in a first time interval. The processor determines a target image set from the at least one real-time image based on an amplitude change of the inertial sensing data corresponding to a second time interval. The processor generates a response instruction based on an analysis result corresponding to the target image set, wherein the analysis result is generated based on a voice prompt corresponding to a user.

Another objective of the present disclosure is to provide a response instruction generating method, which is adapted for use in a smart glasses device. The smart glasses device comprises an image capturing device, an inertial measurement unit, and a processor, the inertial measurement unit is configured to generate a plurality of inertial sensing data. The response instruction generating method comprises the following steps: in response to receiving a startup instruction, activating the image capturing device to capture at least one real-time image in a first time interval; determining a target image set from the at least one real-time image based on an amplitude change of the inertial sensing data corresponding to a second time interval; and generating a response instruction based on an analysis result corresponding to the target image set, wherein the analysis result is generated based on a voice prompt corresponding to a user.

According to the above descriptions, the response instruction generating technology (at least including the device and the method) provided by the present disclosure can actively determine the target image set to be analyzed based on the amplitude change of the inertial sensing data, and generate a response instruction in real time based on the user's voice prompt and the target image set. In addition, the response instruction generating technology provided in the present disclosure also provides a variety of operating mechanisms to further reduce computing resource consumption and device power consumption. Therefore, the response instruction generating technology provided by the present disclosure reduces the computational burden of the response instruction generating technology (i.e., there is no need to analyze all real-time images), solves the shortcomings of the existing technology, and improves the user's service experience.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a smart glasses device and a response instruction generating method according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
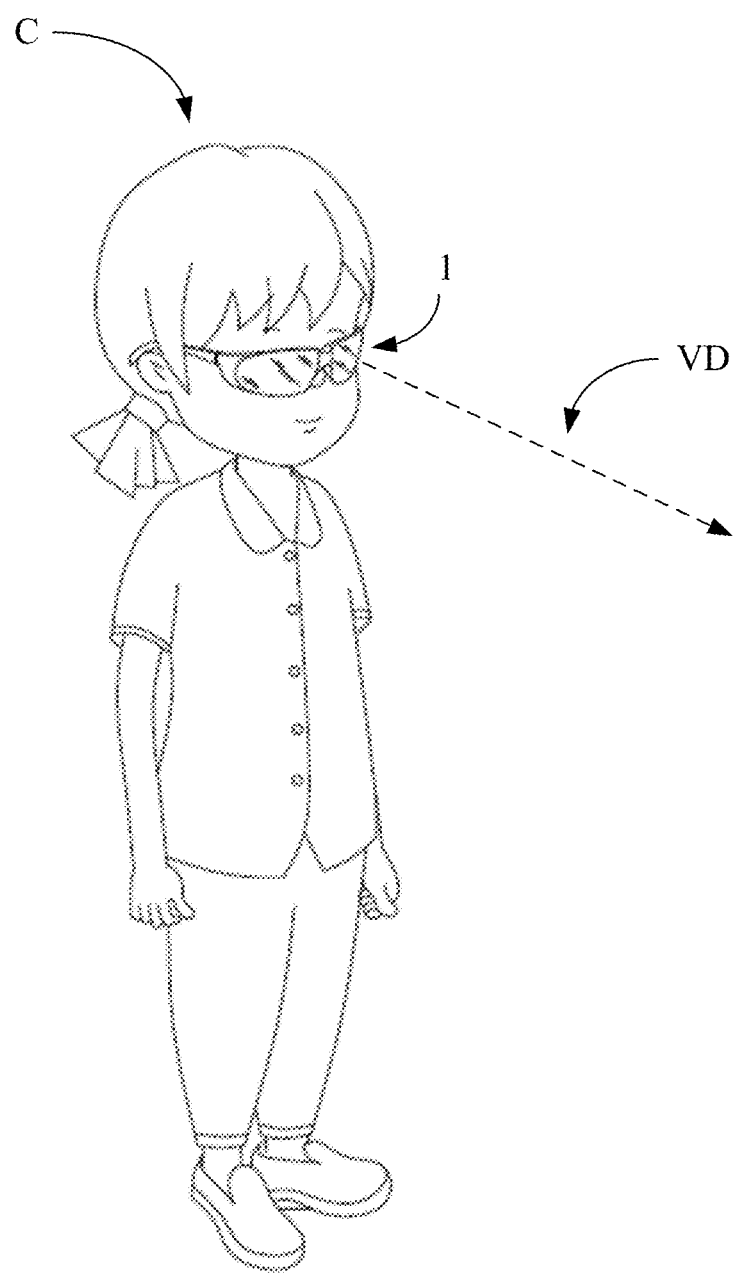
FIG. 1 is a schematic diagram depicting the applicable scenario of the smart glasses device of the first embodiment.

First, the applicable scenario of the present embodiment will be described, and a schematic diagram of which is depicted in FIG. 1. As shown in FIG. 1, in the application environment of the present disclosure, the user C can use the smart glasses device 1 to perform daily activities, and the smart glasses device 1 may generate response instruction to the user C at the appropriate time.

For example, when the user C is standing in front of a shelf in a store, the user C can ask the smart glasses device 1 by raising a voice prompt, for example: a voice prompt of "Which milk is better?" or a voice prompt of "Where is the milk?"

Next, the smart glasses device 1 analyzes the semantics and images to generate a response instruction corresponding to the voice prompt to the user C, for example: response instructions for "X brand of milk on the shelf is more recommended", "Milk is located on the far right of the third shelf" or "Milk is on the second shelf, next to the cheesecake.", etc.

Figure 2A:
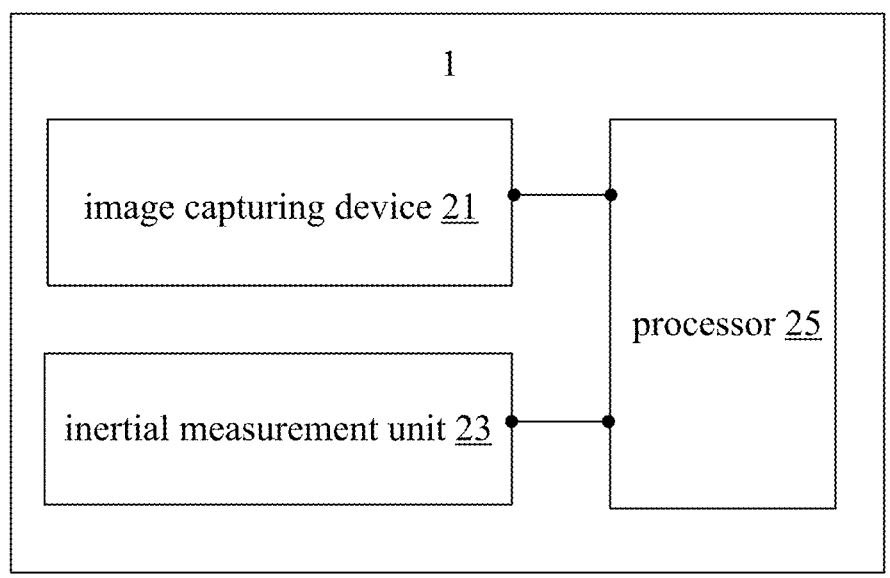
FIG. 2A is a schematic diagram depicting the structure of the smart glasses device of some embodiments.

In the present embodiment, a schematic diagram of the structure of the smart glasses device 1 is depicted in FIG. 2A. The smart glasses device 1 comprises an image capturing device 21, an inertial measurement unit 23, and a processor 25. The processor 25 is electrically connected to the image capturing device 21 and the inertial measurement unit 23 (e.g., IMU).

In the present embodiment, the image capturing device 21 is configured to capture a real-time image corresponding to a field of view (FOV), the inertial measurement unit 23 is configured to detect a plurality of inertial sensing data corresponding to the smart glasses device 1 worn by the user C (e.g., the user C's head swinging movement).

Specifically, the inertial measurement unit 23 may continuously generate a series of inertial sensing data (e.g., a stream of inertial sensing data generated at a frequency of 1000 times per second). In some embodiments, each of the inertial sensing data may comprise one or a combination of an acceleration, a rotation amount, and angular velocity. In some embodiments, the inertial sensing data can be raw data, and an acceleration, a rotation amount, an angular velocity can be further calculated through the raw data. During operation, the processor 25 may periodically receive the inertial sensing data from the inertial measurement unit 23.

Figure 3:
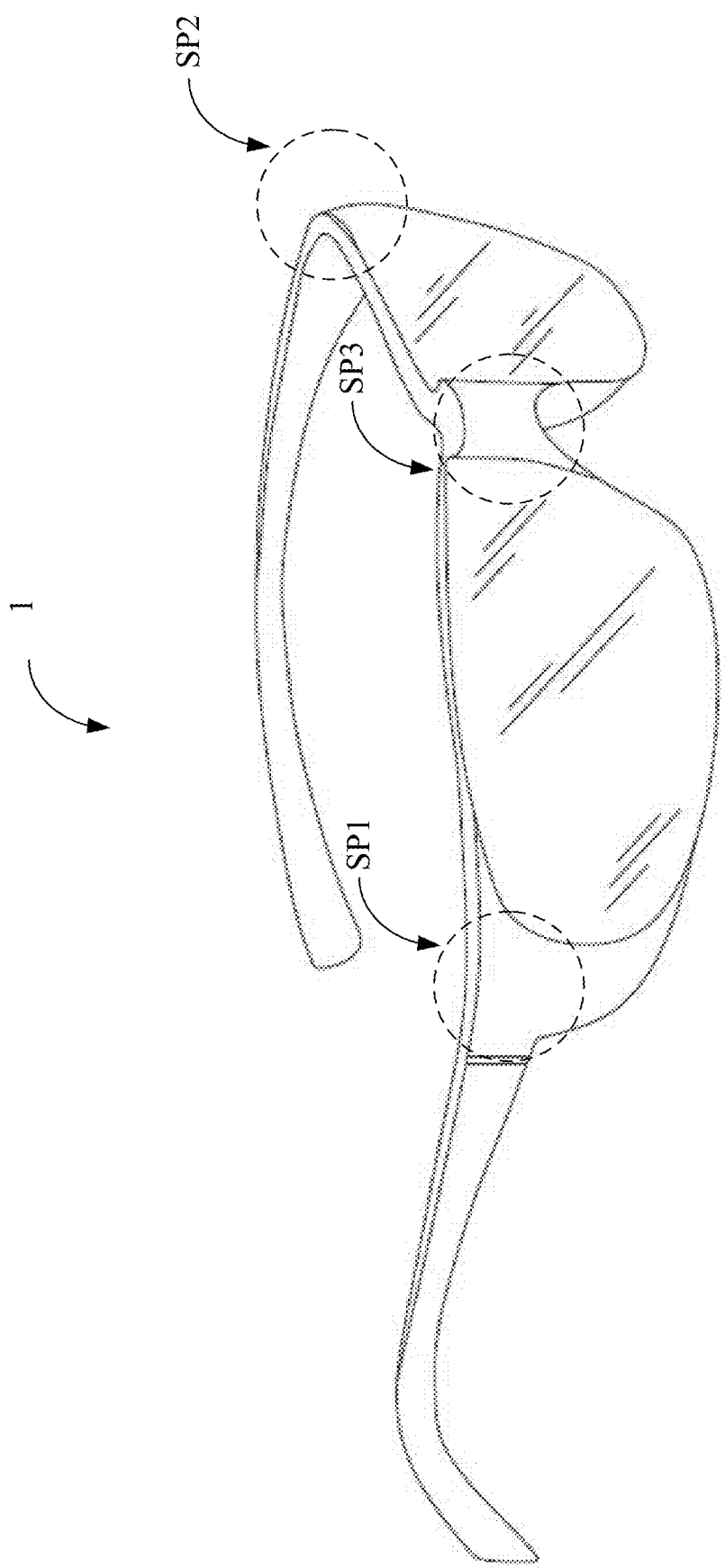
FIG. 3 is a schematic diagram depicting the smart glasses device of some embodiments.

In some embodiments, a schematic diagram of the smart glasses device 1 is depicted in FIG. 3. As shown in FIG. 3, the image capturing device 21 and the inertial measurement unit 23 can be disposed at the setting position SP1, SP2 or SP3 in FIG. 3.

For example, as the viewing direction VD of the user C shown in FIG. 1, the image capturing device 21 can be set based on the viewing direction VD of the user C (i.e., facing the same direction as the user's viewing direction VD).

Figure 2B:
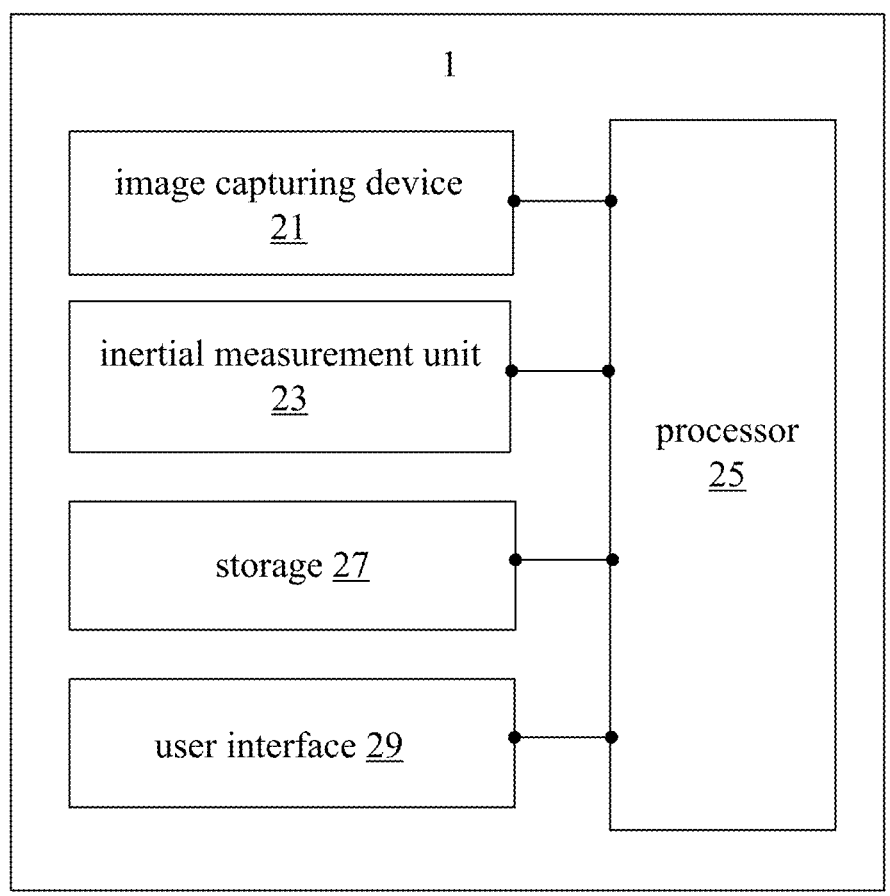
FIG. 2B is a schematic diagram depicting the structure of the smart glasses device of some embodiments.

In some embodiments, as shown in FIG. 2B, the smart glasses device 1 further comprises a storage 27 and a user interface 29.

It shall be appreciated that the image capturing device 21 may be any device with the function of generating images (e.g., a camera, depth camera). The processor 25 may be any of various processors, Central Processing Units (CPUs), microprocessors, digital signal processors or other computing apparatuses known to those of ordinary skill in the art. The storage 27 may be a memory, a Universal Serial Bus (USB) disk, a hard disk, a Compact Disk (CD), a mobile disk, or any other storage medium or circuit known to those of ordinary skill in the art and having the same functionality. The user interface 29 may be any device that can interact with the user, such as a display, a speaker, and a voice receiver.

It shall be appreciated that the user interface 29 is configured to play the response instruction generated by the processor 25. In some embodiments, when the user interface 29 is a display (e.g., a display screen on a lens), the response instruction provides visual feedback through the display. In some embodiments, when the user interface 29 is a speaker, the response instruction is to play the sound corresponding to the response instruction through the speaker.

The following will specifically describe the technology of the smart glasses device 1 in the present disclosure to understand the content range that the user C needs to obtain based on sensing the current state of the user C to determine how to generate a response instruction.

In the present embodiment, in order to save computing resources and improve operation efficiency, the image capturing device 21 does not need to be turned on for a long time when the smart glasses device 1 is in operation. The processor 25 may only activate the image capturing device 21 for shooting when it determines that the smart glasses device 1 is receiving the startup instruction.

Specifically, in response to receiving a startup instruction, the processor 25 activates the image capturing device 21 to capture at least one real-time image in a first time interval. In some embodiments, the first time interval may be the time interval from when the smart glasses device 1 receives the startup instruction to when the user C finishes raising the voice prompt.

In some embodiments, the startup instruction comprises a voice startup instruction (for example: generated by the user C through voice) or a hardware control signal (for example: generated by the user C through a hardware button).

In some embodiments, in order to make the computer vision recognition of the environment or actions of the user C more accurate, the processor 25 may send a control signal to activate the image capturing device 21 to capture continuous images (e.g., streaming images). The continuous images are used to perform subsequent real-time image analysis operations.

Next, in the present embodiment, the processor 25 actively determines whether the user C is looking at a static range or searching for a wider range (i.e., swinging the head to find the target object). Accordingly, based on the aforementioned determination results, it is decided whether the target image set uses a single image or multiple images (for example: streaming images).

Specifically, the processor 25 determines a target image set from the at least one real-time image based on an amplitude change of the inertial sensing data corresponding to a second time interval.

It shall be appreciated that, according to different application scenarios, different second time intervals can be dynamically adjusted for determination. For example, the second time interval may be the time interval from before the smart glasses device 1 receives the startup instruction to when the user C finishes raising the voice prompt. For another example, the second time interval may be the time interval from after the smart glasses device 1 receives the startup instruction to when the user C finishes raising the voice prompt. For another example, the second time interval may be the time interval during which the user C raises the voice prompt.

In some embodiments, the processor 25 may determine the target image set by determining whether the head swing amplitude of the user C is greater than a preset swing amplitude (i.e., decide to use a single image or multiple images in the at least one real-time image).

Specifically, the processor 25 calculates whether the amplitude change of the inertial sensing data corresponding to the second time interval is greater than a first preset value.

Then, in response to the amplitude change of the inertial sensing data being less than the first preset value, the processor 25 selects a first target real-time image from the at least one real-time image as the target image set. In addition, in response to the amplitude change of the inertial sensing data being greater than the first preset value, the processor 25 selects a plurality of second target real-time images from the at least one real-time image as the target image set.

In some embodiments, the first time interval and the second time interval may be dynamic adjustment intervals, and the second time interval may partially overlap with the first time interval. In some embodiments, the first time interval may be a part of the second time interval.

In some embodiments, in order to improve the accuracy of image determination and reduce the number of images that need to be considered, the processor 25 can first calculate the time interval in which the amplitude of the inertial sensing data changes significantly, and select multiple target real-time images from the real-time images corresponding to the time interval. Specifically, the second target real-time images are selected from the at least one real-time image corresponding to a third time interval, and the third time interval is determined based on the amplitude change of the inertial sensing data.

Finally, in the present embodiment, the processor 25 generates a response instruction based on an analysis result corresponding to the target image set, wherein the analysis result is generated based on a voice prompt corresponding to a user.

To facilitate understanding, the following will illustrate several ways for the processor 25 to generate analysis results and response instructions based on the target image set.

In some embodiments, the processor 25 can input the target image set and the voice prompt to the convolutional neural network (for example, a trained convolutional neural network) to determine the result corresponding to the voice prompt of the user C, and generate a corresponding response instruction.

Figure 4A:
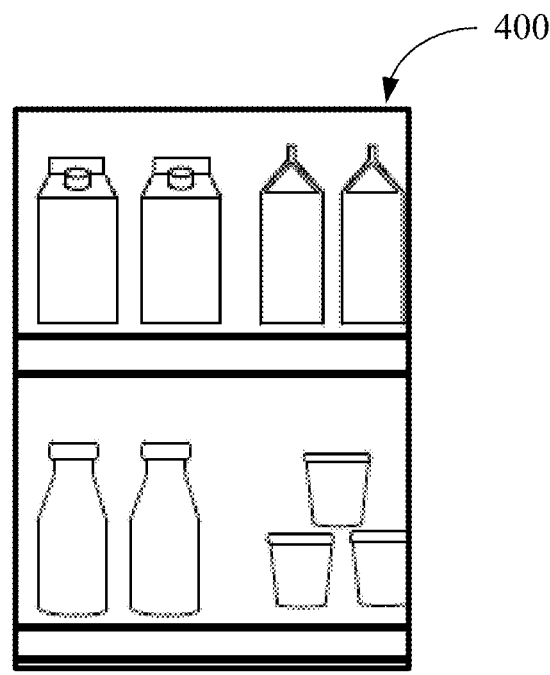
FIG. 4A is a schematic diagram depicting the target real-time image of some embodiments.

For example, the user C is standing in front of a shelf in a store, staring still at the shelf in front (i.e., the target real-time image 400 as shown in FIG. 4A), and the user C raises a voice prompt asking the smart glasses device 1, for example: "Which milk is better?". In the present example, since the smart glasses device 1 does not detect the large head swing of the user C, the analysis result and the response instruction can be generated based only on the target image set including the target real-time image 400. In the present example, the smart glasses device 1 can generate a response instruction "X brand of milk on the shelf is more recommended" to the user C.

In some embodiments, in order to increase the processing speed of analysis results, the processor 25 can combine multiple real-time images into a single image in advance to reduce the computational burden. Specifically, in response to the target image set comprising the second target real-time images, the processor 25 generates a panoramic composite image based on the second target real-time images. Then, the processor 25 inputs the panoramic composite image and the voice prompt into an analysis model to generate the analysis result corresponding to the target image set.

For example, the user C stands in front of a shelf in a store, swings his head and looks at the shelf in front of him, and the user C raises a voice prompt to ask the smart glasses device 1, for example: "Where is the milk?".

In the present example, since the smart glasses device 1 detects a large head swing of the user C, it is necessary to generate the analysis result and the response instruction based on a target image set including a plurality of target real-time images.

Figure 4B:
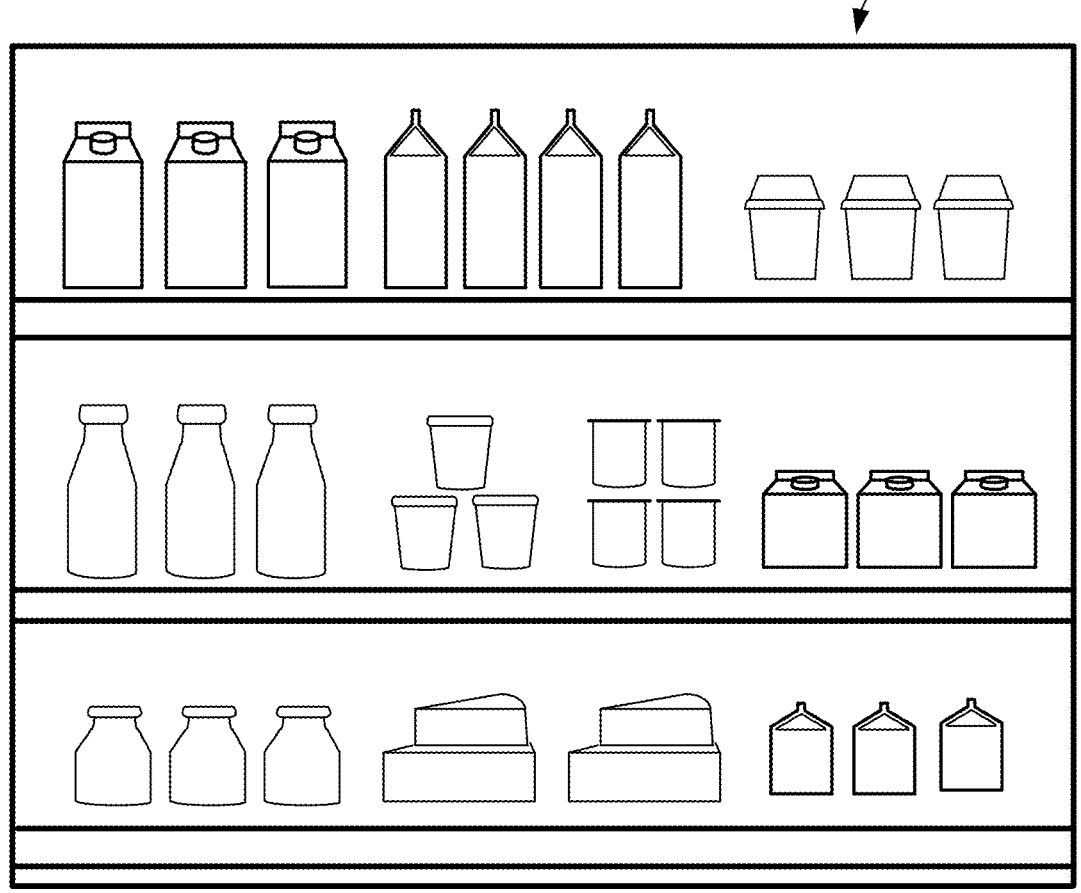
FIG. 4B is a schematic diagram depicting the panoramic composite image of some embodiments.

In the present example, the processor 25 synthesizes a plurality of target real-time images into a panoramic composite image 401 as shown in FIG. 4B. The smart glasses device 1 can generate a response instruction "Milk is located at the leftmost position of the second shelf" to the user C based on the panoramic composite image 401.

It shall be appreciated that the present disclosure does not limit the type of analysis model. The analysis model can be any analysis model that can generate corresponding analysis results based on the user's voice prompts and images (for example: generative AI model, etc.). In some embodiments, the smart glasses device 1 can also generate response instructions with the assistance of an external device.

In some embodiments, as shown in FIG. 2B, the smart glasses device 1 further comprises a storage 27, and the storage 27 is electrically connected to the processor 25. The storage 27 is configured to store the at least one real-time image corresponding to the first time interval, and the processor 25 determines the target image set from the at least one real-time image stored in the storage 27.

In some embodiments, in order to save computing resources, the processor 25 will first determine whether the voice prompt raised by the user C is related to image analysis to determine whether to start the operation of determining the target image set. Specifically, after receiving the startup instruction, the processor 25 receives the voice prompt corresponding to the user C. Next, the processor 25 determines whether the voice prompt corresponding to the user corresponds to an image analysis type. Then, in response to the voice prompt corresponding to the image analysis type, the processor 25 activates the operation of determining the target image set. In addition, in response to the voice prompt not corresponding to the image analysis type, the processor 25 does not activate the operation of determining the target image set.

In some embodiments, the response instruction comprises at least one of a coordinate corresponding to a target object, an orientation, a target object position, and a target object relationship content or a combination thereof.

In some embodiments, the processor 25 may further determine the activation function to be adopted by the image capturing device 21 based on the amplitude change and the default value of the inertial sensing data of the smart glasses device 1. The processor 25 can additionally set default values for judgment and activate the image capturing device 21 through different operating modes to save operating resources.

Specifically, the processor 25 determines an operation mode corresponding to the image capturing device 21 based on the amplitude change of the inertial sensing data corresponding to a fourth time interval and a second preset value. Finally, the processor 25 activates the image capturing device 21 based on the operation mode to capture the at least one real-time image.

In some embodiments, the second preset value is generated based on a human eye focus angle corresponding to the user C.

In some embodiments, the operation mode may include a video mode (i.e., capturing multiple images) and an image mode (i.e., capturing only one image).

In some embodiments, the processor 25 calculates whether the amplitude change of the inertial sensing data corresponding to the fourth time interval is greater than the second preset value. Then, in response to the amplitude change being greater than the second preset value, the processor 25 activates the image capturing device 21 based on the video mode to capture a plurality of first real-time images. In addition, in response to the amplitude change being less than the second preset value, the processor 25 activates the image capturing device 21 based on the image mode to capture a second real-time image.

In some embodiments, the fourth time interval may be the time interval from after the smart glasses device 1 receives the startup instruction to before activating the image capturing device 21.

Figure 5:
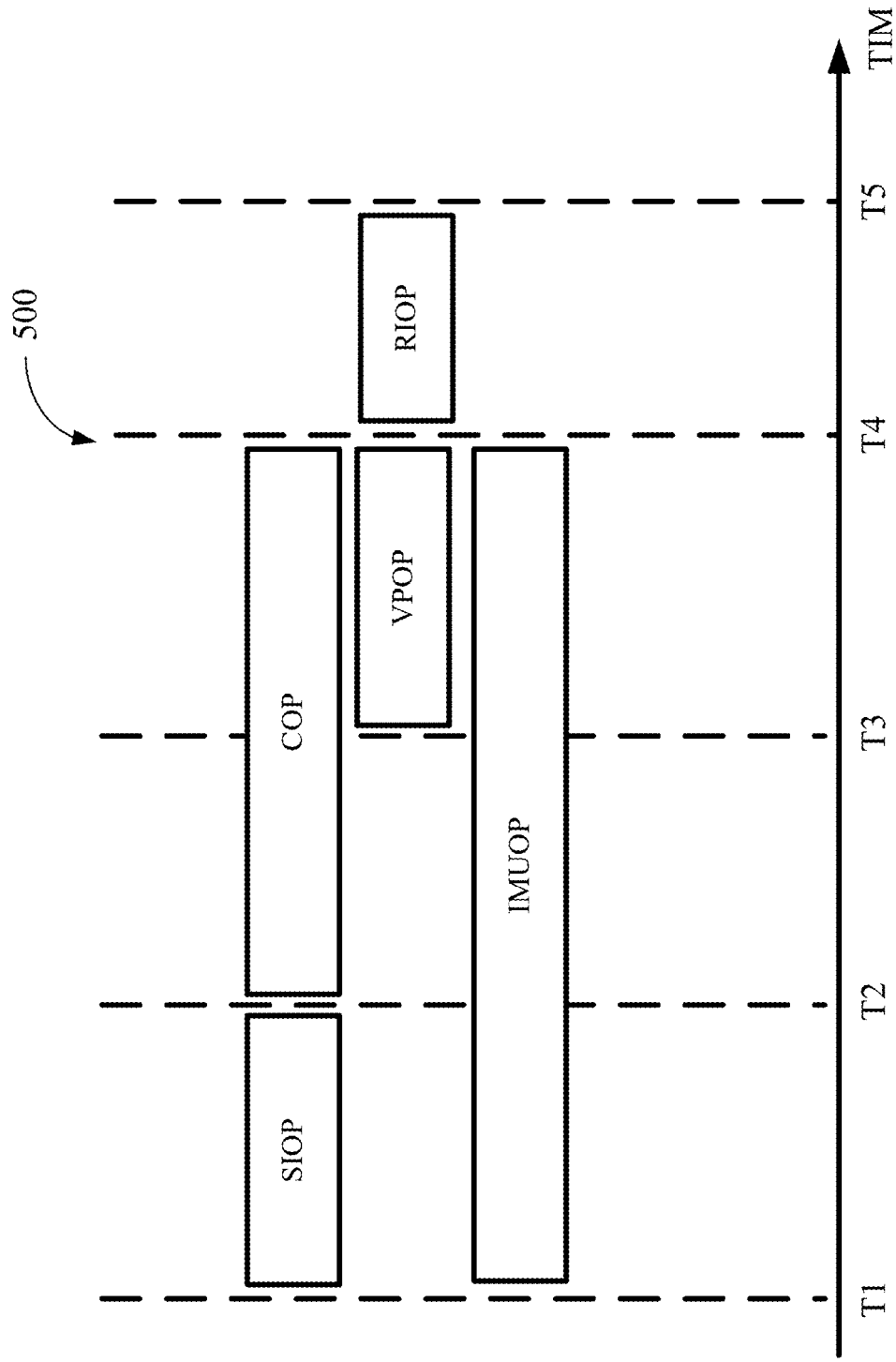
FIG. 5 is a schematic diagram depicting the operation sequence of some embodiments.

For ease of understanding, please refer to an operation sequence diagram 500 in FIG. 5, the horizontal axis is time TIM. In the present example, the smart glasses device 1 executes the operation SIOP from time point T1 to time point T2 to receive the startup instruction. Then, in response to receiving the startup instruction, the smart glasses device 1 executes the operation COP from time point T2 to time point T4 to activate the image capturing device 21 to perform the image capturing function.

In the present example, the smart glasses device 1 performs the operation VPOP from time point T3 to time point T4 to receive the voice prompt of the user C. In the present example, the inertial measurement unit 23 in the smart glasses device 1 can continuously perform the operation IMUOP from time point T1 to time point T4 to generate inertial sensing data.

In the present example, the smart glasses device 1 can perform the operation RIOP from time point T4 to time point T5 to generate a response instruction based on the amplitude change determination mechanism and the mechanism for generating the target image set described in the present disclosure.

According to the above descriptions, the smart glasses device 1 provided by the present disclosure can actively determine the target image set to be analyzed based on the amplitude change of the inertial sensing data, and generate a response instruction in real time based on the user's voice prompt and the target image set. In addition, the smart glasses device 1 provided in the present disclosure also provides a variety of operating mechanisms to further reduce computing resource consumption and device power consumption. Therefore, the smart glasses device 1 provided by the present disclosure reduces the computational burden of the response instruction generating technology (i.e., there is no need to analyze all real-time images), solves the shortcomings of the existing technology, and improves the user's service experience.

Figure 6:
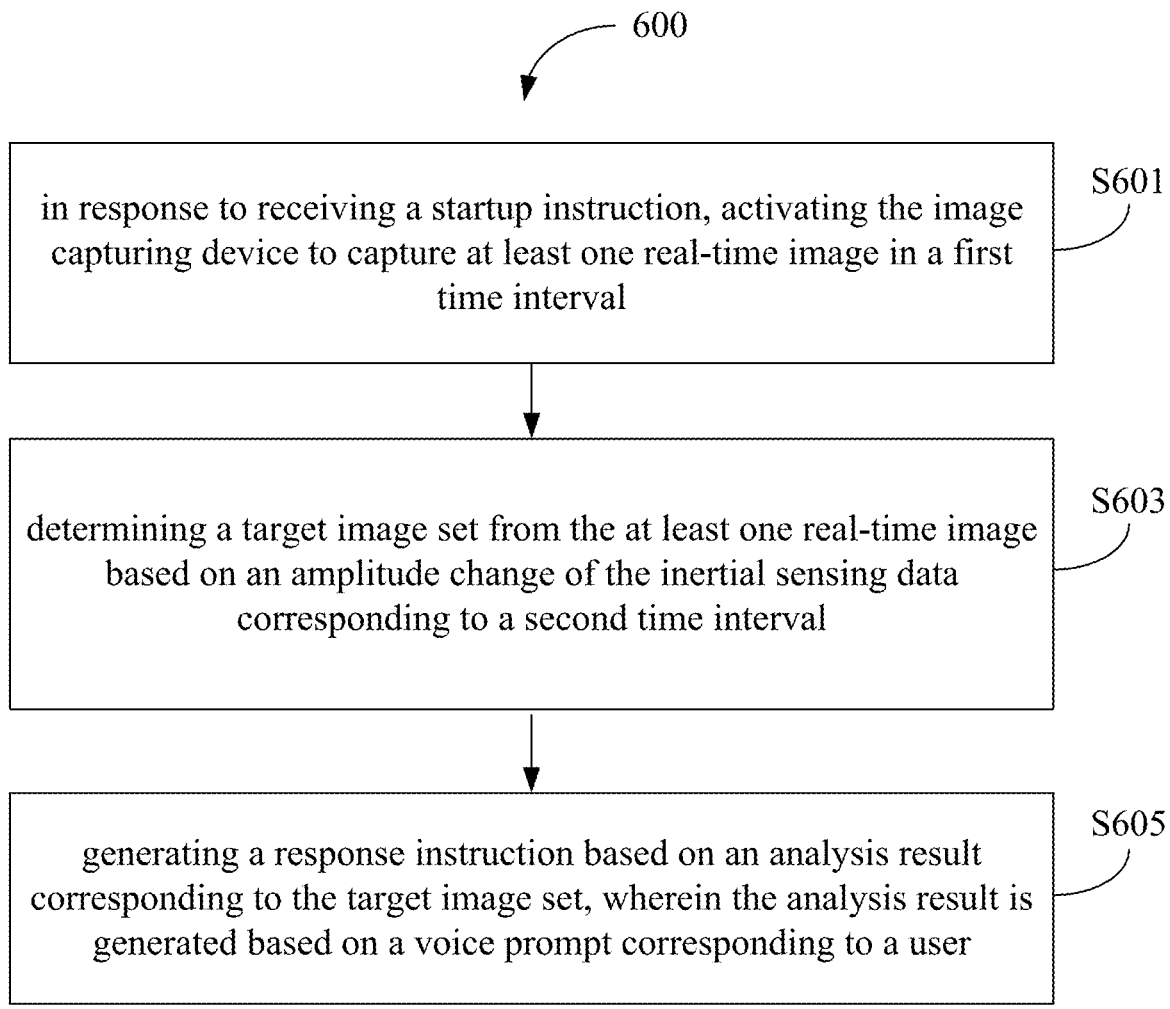
FIG. 6 is a partial flowchart depicting the response instruction generating method of the second embodiment.

A second embodiment of the present disclosure is a response instruction generating method and a flowchart thereof is depicted in FIG. 6. The response instruction generating method 600 is adapted for a smart glasses device (e.g., the smart glasses device 1 described in the first embodiment). The smart glasses device comprises an image capturing device, an inertial measurement unit, and a processor (e.g., the image capturing device 21, the inertial measurement unit 23, and the processor 25 described in the first embodiment). The inertial measurement unit is configured to generate a plurality of inertial sensing data. The response instruction generating method 600 generates a response instruction through the steps S601 to S605.

In the step S601, in response to receiving a startup instruction, the smart glasses device activates the image capturing device to capture at least one real-time image in a first time interval.

Next, in the step S603, the smart glasses device determines a target image set from the at least one real-time image based on an amplitude change of the inertial sensing data corresponding to a second time interval.

Finally, in the step S605, the smart glasses device generates a response instruction based on an analysis result corresponding to the target image set, wherein the analysis result is generated based on a voice prompt corresponding to a user.

In some embodiments, wherein the step of determining the target image set comprises the following steps: calculating whether the amplitude change of the inertial sensing data corresponding to the second time interval is greater than a first preset value; in response to the amplitude change of the inertial sensing data being less than the first preset value, selecting a first target real-time image from the at least one real-time image as the target image set; and in response to the amplitude change of the inertial sensing data being greater than the first preset value, selecting a plurality of second target real-time images from the at least one real-time image as the target image set.

In some embodiments, the second target real-time images are selected from the at least one real-time image corresponding to a third time interval, and the third time interval is determined based on the amplitude change of the inertial sensing data.

In some embodiments, the analysis result is generated based on the following steps: in response to the target image set comprising the second target real-time images, generating a panoramic composite image based on the second target real-time images; and inputting the panoramic composite image and the voice prompt into an analysis model to generate the analysis result corresponding to the target image set.

In some embodiments, the smart glasses device further comprises a storage, the storage is configured to store the at least one real-time image corresponding to the first time interval, and the response instruction generating method 600 further comprises the following steps: determining the target image set from the at least one real-time image stored in the storage.

In some embodiments, the response instruction generating method 600 further comprises the following steps: after receiving the startup instruction, receiving the voice prompt corresponding to the user; determining whether the voice prompt corresponding to the user corresponds to an image analysis type; in response to the voice prompt corresponding to the image analysis type, activating the operation of determining the target image set; and in response to the voice prompt not corresponding to the image analysis type, not activating the operation of determining the target image set.

In some embodiments, the response instruction comprises at least one of a coordinate corresponding to a target object, an orientation, a target object position, and a target object relationship content or a combination thereof, the smart glasses device further comprises a speaker, and the response instruction generating method 600 further comprises the following steps: playing the response instruction through the speaker.

In some embodiments, the step of activating the image capturing device further comprises the following steps: determining an operation mode corresponding to the image capturing device based on the amplitude change of the inertial sensing data corresponding to a fourth time interval and a second preset value, wherein the second preset value is generated based on a human eye focus angle corresponding to the user; and activating the image capturing device based on the operation mode to capture the at least one real-time image.

In some embodiments, the operation mode comprises a video mode and an image mode, and the step of determining the operation mode corresponding to the image capturing device further comprises the following steps: calculating whether the amplitude change of the inertial sensing data corresponding to the fourth time interval is greater than the second preset value; in response to the amplitude change being greater than the second preset value, activating the image capturing device based on the video mode to capture a plurality of first real-time images; and in response to the amplitude change being less than the second preset value, activating the image capturing device based on the image mode to capture a second real-time image.

In some embodiments, the startup instruction comprises a voice startup instruction or a hardware control signal.

In addition to the aforesaid steps, the second embodiment can also execute all the operations and steps of the smart glasses device 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The response instruction generating method described in the second embodiment may be implemented by a computer program having a plurality of codes. The computer program may be a file that can be transmitted over the network, or may be stored into a non-transitory computer readable storage medium. After the codes of the computer program are loaded into an electronic device (e.g., the smart glasses device 1), the computer program executes the response instruction generating method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

It shall be appreciated that in the specification and the claims of the present disclosure, some words (e.g., the time interval, the preset value, the target real-time image, etc.) are preceded by terms such as "first", "second", "third", or "fourth", and these terms of "first", "second", "third", or "fourth" are only used to distinguish these different words. For example, the "first" and "second" time intervals are only used to indicate the time interval used in different operations.

According to the above descriptions, the response instruction generating technology (at least including the device and the method) provided by the present disclosure can actively determine the target image set to be analyzed based on the amplitude change of the inertial sensing data, and generate a response instruction in real time based on the user's voice prompt and the target image set. In addition, the response instruction generating technology provided in the present disclosure also provides a variety of operating mechanisms to further reduce computing resource consumption and device power consumption. Therefore, the response instruction generating technology provided by the present disclosure reduces the computational burden of the response instruction generating technology (i.e., there is no need to analyze all real-time images), solves the shortcomings of the existing technology, and improves the user's service experience.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A smart glasses device, comprising:
an image capturing device;
an inertial measurement unit, being configured to generate a plurality of inertial sensing data; and
a processor, being electrically connected to the image capturing device and the inertial measurement unit, and being configured to perform the following operations:
in response to receiving a startup instruction, activating the image capturing device to capture at least one real-time image in a first time interval;
determining a target image set from the at least one real-time image based on an amplitude change of the inertial sensing data corresponding to a second time interval; and
generating a response instruction based on an analysis result corresponding to the target image set, wherein the analysis result is generated based on a voice prompt corresponding to a user.

2. The smart glasses device of claim 1, wherein the operation of determining the target image set comprises the following operations:
calculating whether the amplitude change of the inertial sensing data corresponding to the second time interval is greater than a first preset value;
in response to the amplitude change of the inertial sensing data being less than the first preset value, selecting a first target real-time image from the at least one real-time image as the target image set; and
in response to the amplitude change of the inertial sensing data being greater than the first preset value, selecting a plurality of second target real-time images from the at least one real-time image as the target image set.

3. The smart glasses device of claim 2, wherein the second target real-time images are selected from the at least one real-time image corresponding to a third time interval, and the third time interval is determined based on the amplitude change of the inertial sensing data.

4. The smart glasses device of claim 2, wherein the analysis result is generated based on the following operations:

in response to the target image set comprising the second target real-time images, generating a panoramic composite image based on the second target real-time images; and inputting the panoramic composite image and the voice prompt into an analysis model to generate the analysis result corresponding to the target image set.

5. The smart glasses device of claim 1, wherein the smart glasses device further comprises:

a storage, being electrically connected to the processor, and being configured to store the at least one real-time image corresponding to the first time interval, wherein the processor determines the target image set from the at least one real-time image stored in the storage.

6. The smart glasses device of claim 1, wherein the processor further performs the following operations:

after receiving the startup instruction, receiving the voice prompt corresponding to the user;

determining whether the voice prompt corresponding to the user corresponds to an image analysis type;

in response to the voice prompt corresponding to the image analysis type, activating the operation of determining the target image set; and in response to the voice prompt not corresponding to the image analysis type, not activating the operation of determining the target image set.

7. The smart glasses device of claim 1, wherein the response instruction comprises at least one of a coordinate corresponding to a target object, an orientation, a target object position, and a target object relationship content or a combination thereof, and the smart glasses device further comprises:

a speaker, being electrically connected to the processor, wherein the processor further plays the response instruction through the speaker.

8. The smart glasses device of claim 1, wherein the operation of activating the image capturing device further comprises the following operations:

determining an operation mode corresponding to the image capturing device based on the amplitude change of the inertial sensing data corresponding to a fourth time interval and a second preset value, wherein the second preset value is generated based on a human eye focus angle corresponding to the user; and activating the image capturing device based on the operation mode to capture the at least one real-time image.

9. The smart glasses device of claim 8, wherein the operation mode comprises a video mode and an image mode, and the operation of determining the operation mode corresponding to the image capturing device further comprises the following operations:

calculating whether the amplitude change of the inertial sensing data corresponding to the fourth time interval is greater than the second preset value;

in response to the amplitude change being greater than the second preset value, activating the image capturing device based on the video mode to capture a plurality of first real-time images; and in response to the amplitude change being less than the second preset value, activating the image capturing device based on the image mode to capture a second real-time image.

10. The smart glasses device of claim 1, wherein the startup instruction comprises a voice startup instruction or a hardware control signal.

11. A response instruction generating method, being adapted for use in a smart glasses device, wherein the smart glasses device comprises an image capturing device, an inertial measurement unit, and a processor, the inertial measurement unit is configured to generate a plurality of inertial sensing data, and the response instruction generating method comprises:

in response to receiving a startup instruction, activating the image capturing device to capture at least one real-time image in a first time interval;

determining a target image set from the at least one real-time image based on an amplitude change of the inertial sensing data corresponding to a second time interval; and generating a response instruction based on an analysis result corresponding to the target image set, wherein the analysis result is generated based on a voice prompt corresponding to a user.

12. The response instruction generating method of claim 11, wherein the step of determining the target image set comprises the following steps:

calculating whether the amplitude change of the inertial sensing data corresponding to the second time interval is greater than a first preset value;

in response to the amplitude change of the inertial sensing data being less than the first preset value, selecting a first target real-time image from the at least one real-time image as the target image set; and in response to the amplitude change of the inertial sensing data being greater than the first preset value, selecting a plurality of second target real-time images from the at least one real-time image as the target image set.

13. The response instruction generating method of claim 12, wherein the second target real-time images are selected from the at least one real-time image corresponding to a third time interval, and the third time interval is determined based on the amplitude change of the inertial sensing data.

14. The response instruction generating method of claim 12, wherein the analysis result is generated based on the following steps:

in response to the target image set comprising the second target real-time images, generating a panoramic composite image based on the second target real-time images; and inputting the panoramic composite image and the voice prompt into an analysis model to generate the analysis result corresponding to the target image set.

15. The response instruction generating method of claim 11, wherein the smart glasses device further comprises a storage, the storage is configured to store the at least one real-time image corresponding to the first time interval, and the response instruction generating method further comprises the following steps:

determining the target image set from the at least one real-time image stored in the storage.

16. The response instruction generating method of claim 11, wherein the response instruction generating method further comprises the following steps:

after receiving the startup instruction, receiving the voice prompt corresponding to the user;

determining whether the voice prompt corresponding to the user corresponds to an image analysis type;

in response to the voice prompt corresponding to the image analysis type, activating the operation of determining the target image set; and in response to the voice prompt not corresponding to the image analysis type, not activating the operation of determining the target image set.

17. The response instruction generating method of claim 11, wherein the response instruction comprises at least one of a coordinate corresponding to a target object, an orientation, a target object position, and a target object relationship content or a combination thereof, the smart glasses device further comprises a speaker, and the response instruction generating method further comprises the following steps:

playing the response instruction through the speaker.

18. The response instruction generating method of claim 11, wherein the step of activating the image capturing device further comprises the following steps:

determining an operation mode corresponding to the image capturing device based on the amplitude change of the inertial sensing data corresponding to a fourth time interval and a second preset value, wherein the second preset value is generated based on a human eye focus angle corresponding to the user; and activating the image capturing device based on the operation mode to capture the at least one real-time image.

19. The response instruction generating method of claim 18, wherein the operation mode comprises a video mode and an image mode, and the step of determining the operation mode corresponding to the image capturing device further comprises the following steps:

calculating whether the amplitude change of the inertial sensing data corresponding to the fourth time interval is greater than the second preset value;

in response to the amplitude change being greater than the second preset value, activating the image capturing device based on the video mode to capture a plurality of first real-time images; and in response to the amplitude change being less than the second preset value, activating the image capturing device based on the image mode to capture a second real-time image.

20. The response instruction generating method of claim 11, wherein the startup instruction comprises a voice startup instruction or a hardware control signal.

* * * * *